United States Patent [19]
Karube et al.

[11] Patent Number: 4,887,272
[45] Date of Patent: Dec. 12, 1989

[54] LASER OSCILLATOR DEVICE

[75] Inventors: Norio Karube, Machida; Akira Egawa, Yamanashi; Etsuo Yamazaki, Hachioji; Nobuaki Iehisa, Yamanashi; Mitsuo Manabe, Hachioji, all of Japan

[73] Assignee: Fanuc Ltd, Minamitsuru, Japan

[21] Appl. No.: 295,203

[22] PCT Filed: Apr. 28, 1988

[86] PCT No.: PCT/JP88/00424
§ 371 Date: Dec. 20, 1988
§ 102(e) Date: Dec. 20, 1988

[87] PCT Pub. No.: WO88/08632
PCT Pub. Date: Nov. 3, 1988

[30] Foreign Application Priority Data

Apr. 30, 1987 [JP] Japan .................. 62-107825

[51] Int. Cl.$^4$ ............................................. H01S 3/19
[52] U.S. Cl. ........................................ 372/38; 372/82
[58] Field of Search .......................... 372/81, 82, 38

[56] References Cited

U.S. PATENT DOCUMENTS

| | | | |
|---|---|---|---|
| 4,744,087 | 5/1988 | Nicia | 372/38 |
| 4,796,266 | 1/1989 | Banwell et al. | 378/38 |
| 4,809,286 | 3/1989 | Kouanyi et al. | 378/38 |
| 4,823,350 | 4/1989 | Yamazaki | 372/38 |

Primary Examiner—Leon Scott, Jr.
Attorney, Agent, or Firm—Staas & Halsey

[57] ABSTRACT

A laser oscillator device applies a high-frequency voltage to a plurality of discharge regions through a dielectric for producing a high-frequency discharge for laser pumping. The laser oscillator device has current detectors (CT2a, CT2b) for detecting currents flowing from high-frequency power supplies (26a, 26b) into discharge tubes (1). The current detectors are disposed in positions to detect mutual currents between the adjacent discharge tubes. The currents detected by the current detectors (CT2a, CT2b) are used as feedback currents for preventing uncontrollable conditions of the currents due to a coupling current. The laser oscillator device also has a mechanism for preventing interference in the discharge regions.

7 Claims, 11 Drawing Sheets

LASER OSCILLATOR DEVICE

CROSS REFERENCE TO RELATED APPLICATIONS

This application is related to the following copending applications assigned to the same assignee as this application:

1. U.S. Ser. No. 07/283,472 filed Nov. 30, 1988;
2. U.S. Ser. No. 07/273,520 filed Nov. 3, 1988;
3. U.S. Ser. No. 07/283,479 filed Dec. 5, 1988;
4. U.S. Ser. No. 07/283,325 filed Dec. 5, 1988.
5. U.S. patent application entitled: LASER OSCILLATOR DEVICE filed Jan. 12, 1989 having our Docket No. 645.1037;

TECHNICAL FIELD

The present invention relates to a laser oscillator device for producing a high-power laser beam for cutting workpieces of metal or the like, and more particularly to a laser oscillator device capable of stable high-frequency discharge pumping.

BACKGROUND ART

High-frequency discharge pumped axial-flow $CO_2$ lasers are in the process of being developed because of their advantages of high-power output and stable oscillation. One example of such laser is disclosed in Japanese Patent Application No. 61-243212 filed by the applicant.

A conventional axial-flow-type high-frequency discharge pumped laser oscillator device is illustrated in FIG. 10 of the accompanying drawings. The illustrated laser oscillator device includes a discharge tube 1 comprising four tube segments. However, the discharge tube 1 may have a desired number of tube segments dependent on the output to be produced. A total reflection mirror 2 and an output coupling mirror 3 are accurately positioned at the ends of the discharge tube 1. Denoted at 4 is an outgoing laser beam. The segments of the discharge tube 1 have gas inlet and outlet ports connected to a single roots blower 7. Cooling units 5, 6 serve to cool a laser gas heated by the discharge and the roots blower 7. The laser gas flows in the discharge tube 1 and gas delivery tubes in the directions of the arrows. Electrodes 8a, 8b~11a, 11b are connected to respective high-frequency power supplies 12, 13, 14, 15. The gas flows in the discharge tube 1 at the speed of about 100 m/second. An electric discharge is produced in the discharge tube 1 by a high-frequency voltage applied by the high-frequency power supplies 12~15 to generate laser oscillation.

The principles of a conventional high-frequency power supply are illustrated in FIG. 11 of the accompanying drawings. Denoted at 16 is a DC power supply, and at 17 a high-frequency (RF) power supply. DC output from the DC power supply 16 is applied to the high-frequency power supply 17. The high-frequency power supply 17 comprises a branch circuit four FETs 18~21, a boost transformer 22, and an impedance matching circuit 23. The output terminals of the high-frequency power supply 17 are coupled to the discharge tube 1 through electrodes 8a1, 8a2. A CT coil 24 serves to detect a current flowing through the discharge tube 1. A current feedback line 25 feeds back the detected current to control the current supplied to the discharge tube 1 to be constant.

The high-frequency discharge pumping laser has the following many advantages over the ordinary DC discharge pumping laser:

(i) Since it produces an electrodeless discharge, there is no problem of electrode material deterioration.
(ii) No ballast resistor is required.
(iii) There is no cathode fall, and high energy efficiency is obtained.
(iv) The laser can be operated at a low voltage and hence is safe for the operator.
(v) The dissociation ratio of $CO_2$ is low, and so is the running cost.
(vi) The laser has excellent pulse characteristics.
(vii) The laser device can be reduced in size.
(viii) The phenomenon of electron capture can be utilized by sufficiently increasing the frequency to obtain high efficiency.
(ix) The freedom of selection of discharge tube materials is high.

However, the current and voltage of the high-frequency discharge pumping laser tend to oscillate before and after a discharge is started, based on plasma coupling. Oscillation at about 1~10 Hz occurs when the discharge current in the discharge tube 1 is controlled by the feed-back system shown in FIG. 11. As a result, various alarming conditions for the DC power supply 16 tend to take place, and the FETs 18~21 may be destroyed.

SUMMARY OF THE INVENTION

It is an object of the present invention to provide a high-frequency oscillator device which will solve the aforesaid problems and which will not produce alarming conditions for a DC power supply and also not destroy components such as FETs.

According to a first embodiment, there is provided a laser oscillator device for applying a high-frequency voltage to a plurality of discharge tubes made of a dielectric to produce a high-frequency discharge for laser pumping, comprising:

high-frequency power supply means for converting a DC power supply into high-frequency power supply outputs; and current detector means for detecting currents flowing through the discharge tubes, said current detector means being disposed in positions for detecting mutual currents between adjacent discharge tubes, the arrangement being such that output currents of the high-frequency power supplies will be controlled by feeding back the detected currents.

According to a second embodiment, there is provided a laser oscillator device for applying a high-frequency voltage to a plurality of discharge tubes made of a dielectric to produce a high-frequency discharge for laser pumping, comprising:

high-frequency power supply means for converting a DC power supply into high-frequency power supply outputs;

common signal source means for driving the high-frequency power supply means; and current detector means for detecting currents flowing through the discharge tubes, the arrangement being such that output currents of the high-frequency power supply means will be controlled by feeding back the detected currents.

According to a third embodiment, there is provided a laser oscillator device for applying a high-frequency voltage to a plurality of discharge tubes made of a dielectric to produce a high-frequency discharge for laser pumping, comprising:

high-frequency power supply means for converting a DC power supply into high-frequency power supply outputs;

signal source means for driving the high-frequency power supply means with various frequencies;

current detector means for detecting currents flowing through the discharge tubes; and low-pass filter means for removing high-frequency components from signals from the current detector means, the arrangement being such that output currents of the high-frequency power supply means will be controlled by feeding back the current signals from which the high-frequency components have been removed by the low-pass filter means.

According to a fourth embodiment, there is provided a laser oscillator device for applying a high-frequency voltage to a plurality of discharge tubes made of a dielectric to produce a high-frequency discharge for laser pumping, comprising:

parallel-connected high-frequency power supply means for converting a DC power supply into high-frequency power supply outputs; and current detector means for detecting currents flowing through the discharge tubes, said current detector means being disposed in positions for detecting mutual currents between the adjacent discharge tubes, the arrangement being such that output currents of the high-frequency power supply means will be controlled by feeding back the detected currents.

According to a fifth embodiment, there is provided a laser oscillator device for applying a high-frequency voltage to a plurality of discharge tubes made of a dielectric to produce a high-frequency discharge for laser pumping, comprising:

high-frequency power supply means for converting a DC power supply into high-frequency power supply outputs;

current detector means for detecting currents flowing through the discharge tubes; and grounded auxiliary electrodes disposed on intermediate portions of the discharge tubes, the arrangement being such that output currents of the high-frequency power supplies will be controlled by feeding back the current signals from the current detectors.

The aforesaid problems are caused by a mutual current between electrodes. The drawbacks will be described with reference to an arrangement having two electrodes for the sake of brevity. FIG. 2 shows a current flowing between electrodes. Denoted at 1 is a discharge tube. High-frequency voltages are applied to electrodes $8a1$, $8a2$ and electrodes $8b1$, $8b2$ by high-frequency power supplies $26a$, $26b$, respectively.

It is assumed here that the high-frequency power supply $26a$ has a frequency f1, a voltage e1, and a phase $\phi1$, and an inverter $26b$ has a frequency f2, a voltage e2, and a phase $\phi2$. Rogowski coils are positioned as CT1, CT2, and CT3. Currents flowing through these three coils will be described. The following three discharge currents flow in the discharge tube 1:

In-tube discharge current = Id
Intertube coupling current = Is
Power supply loss current = Ir The discharge current Id is given by: $Id = e/Z$ where Z is the impedance between the discharge electrodes $8a$, $8b$ and e is the voltage across these electrodes.

The intertube coupling current Is is a current flowing between the adjacent electrodes on the discharge tube. This current flows as a displacement current at a high frequency since ions remain in a downstream region of the gas. The current Is is difficult to control because the impedance z between the electrodes $8a1$, $8b1$ is abruptly reduced upon a transition from a glow discharge to an arc discharge due to unstable discharge property. The current Is is varied by the difference in phase between the voltages e1, e2.

The loss current Ir is a current drained from the power supply to ground and fed back to the circuit from the grounded point. Generally, the loss current Ir largely depends upon the temperature.

The currents flowing through the respective CTs can be determined as follows:

[Current $I_1$ of CT1]

$I_1 = Id + Is$ (when e1, e2 are in phase),
$I_1 = Id + 3Is$ (when e1, e2 are in opposite phase).
Generally, $$I_1 = Id + \{2 - \sin2\pi(f1 - f2)t\}Is$$
$$= e/Z + e\{2 - \sin2\pi(f1 - f2)t\}/Z$$

[Current $I_2$ of CT2]

$I_2 = Id + Is$ (when e1, e2 are in phase),
$I_2 = Id$ (when e1, e2 are in opposite phase).
Generally, $$I_1 = Id + Is\{1 - \sin2\pi(f1 - f2)t\}/2$$
$$= e/Z + e\{1 - \sin2\pi(f1 - f2)t\}/2z$$

[Current $I_3$ of CT3]

$I_3 = I_1 + Ir$.

These currents are plotted in FIG. 3. The graph of FIG. 3 has a horizontal axis representing the phase difference between the voltages e1, e2 and a vertical axis representing the values of the currents. The curves indicate the values of the currents $I_1$, $I_2$, $I_3$, respectively. The current $I_3$ is however indicated as a web-like curve having a certain width since the current varies with temperature.

[Operation of the first embodiment]

In FIG. 3, the current $I_2$ is of a maximum value (Id+Is) when the voltages e1, e2 are in phase, and of a minimum value (Id=I−Is) when the voltages e1, e2 are in opposite phase (the phase difference is $\pi$). I indicates all the current supplied from the power supply. When the current Is is produced by an arc discharge, it provides a considerable portion of the entire current I as the impedance z between the discharge tubes is greatly reduced. As a consequence, the current from a high-frequency power supply $26a$ is abruptly lowered under feedback control, thus possibly destroying destructing the FETs 18∼21 shown in FIG. 11. The feedback current should be $I_1$ (CT1) or $I_3$ (CT3).

Where $I_1$ (CT1) is used as the detected current, CT1 is on the high-voltage side. Therefore, the Rogowski coil used as CT1 must be capable of withstanding a high voltage.

[Operation of the second embodiment]

Prior to the start of a discharge, the voltage oscillates, and after a discharge has started, the current oscillates. Since the oscillating voltage may well go beyond a prescribed voltage, it tends to produce various alarming conditions for the power supply, stop the device, and destroy the FETs or the like in the worst cases. The current oscillation makes the laser output unstable. This is caused by using any of the currents as the feedback current. An example which employs $I_1$ (CT1) will be described below.

$$I_1 = Id(t) + Is\{2 - \sin 2\pi(f1-f2)t\}$$

Since the $I_1$ (CT1) is maintained at a constant level K when it is fed back, Id(t) becomes:

$$Id(t) = K - Is\{2 - \sin 2\pi(f1-fs)t\}$$

and fluctuates at the period of (f1−f2). Inasmuch as the quartz oscillator of a drive signal source used has a six-figure degree of accuracy, the period of (f1−f2) is in the range of 1 to 10 Hz. This also holds true for the oscillation before the discharge.

Therefore, the oscillation is removed by applying the voltages to the electrodes in phase.

[Operation of the third embodiment]

The oscillation is eliminated by removing an AC component from the feedback current signals with the low-pass filters by making the frequencies of the power supplies widely different from each other.

[Operation of the fourth embodiment]

The oscillation is removed by driving the discharge tubes with the common parallel-connected power supplies.

[Operation of the fifth embodiment]

Effects of the mutual current are removed by providing the electrode on the intermediate portion of the discharge tube.

DESCRIPTION OF THE PREFERRED EMBODIMENT

Embodiments of the present invention will hereinafter be described in specific detail with reference to the drawings.

[First embodiment]

Figure 1:
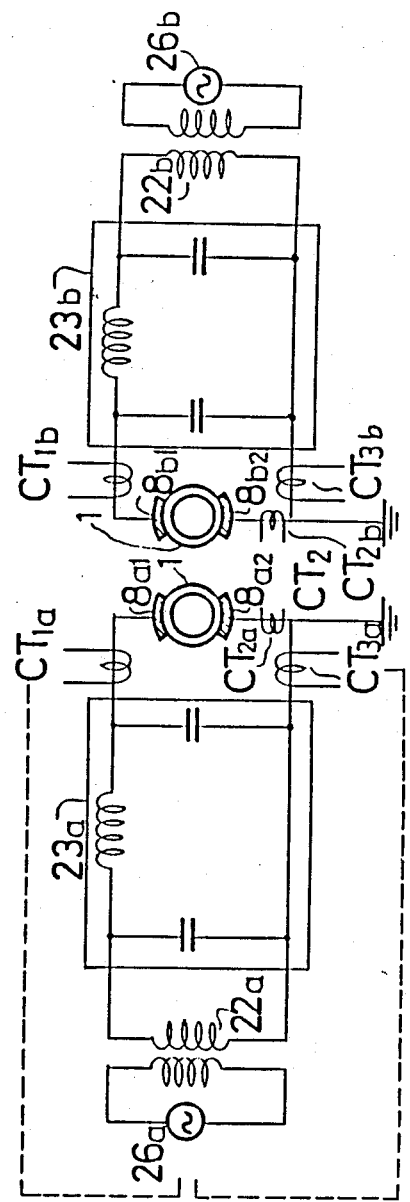
FIG. 1 is a circuit diagram of a first embodiment.

FIG. 1 is a circuit diagram of a first embodiment of the present invention. Designated at 26a, 26b are high-frequency power supplies, at 22a, 22b are boosting transformers, at 23a, 23b are impedance matching circuits, at 1 are discharge tubes, and at CT1a, CT1b, CT2a, CT2b, CT3a, CT3b are current detectors (Rogowski coils). Since the circuit arrangement has two identical circuits on its righthand and lefthand sides, only the lefthand circuits will be described below.

As described above in the [Operation] section, the currents from the current detectors CT1a or CT3a are used as feedback currents for avoiding uncontrollable conditions caused by coupling currents between electrodes (8a1, 8a2 and 8b1, 8b2). Use of CT1a or CT3a has both advantages and disadvantages. Where CT1a is used, it is not affected by the power supply loss current Ir (current drained to ground), but has a high voltage. Where CT3a is used, it is affected by the power supply loss current Ir, but it may be a low-voltage current detector.

[Second embodiment]

Figure 4:
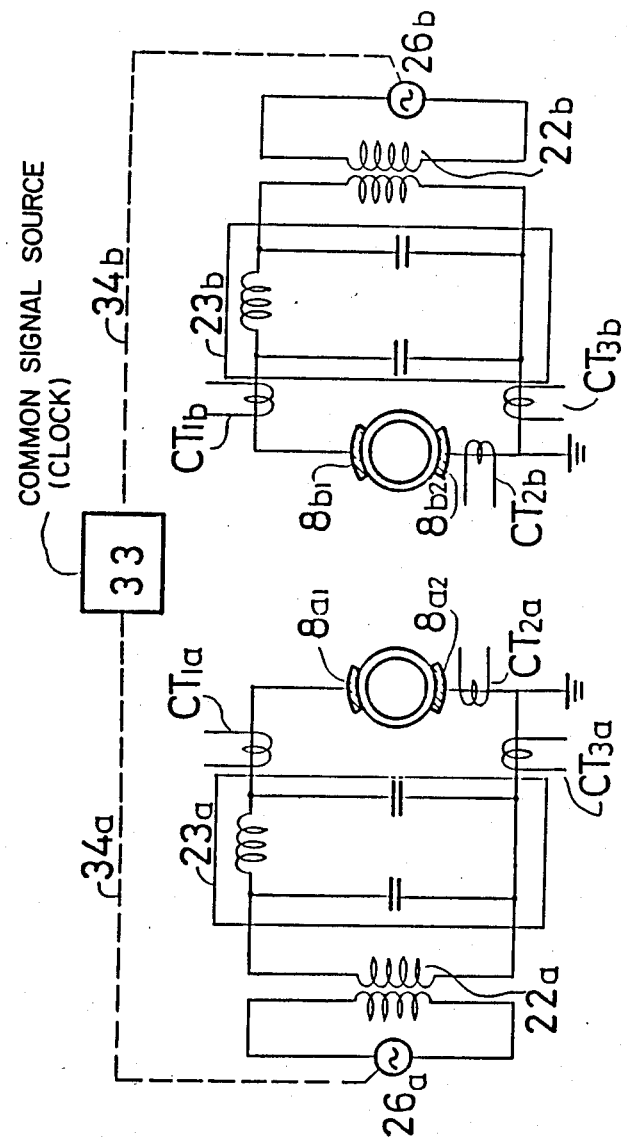
FIG. 4 is a circuit diagram of a second embodiment.

FIG. 4 is a circuit diagram of a second embodiment. Those parts in FIG. 4 which are identical to those of the FIG. 1 are denoted by identical reference characters, and will not be described. In this embodiment, the problem of unstable current and voltage due to the phase difference between the electrodes can be solved by driving the high-frequency power supplies 26a, 26b with one signal source (the same clock) 33. The signal source 33 has one quartz oscillator for driving the high-frequency power supplies 26a, 26b. Where the number of the electrodes used is increased, feedback signal lines 34a, 34b become longer, and hence should be sufficiently protected against noise.

[Third embodiment]

Figure 5:
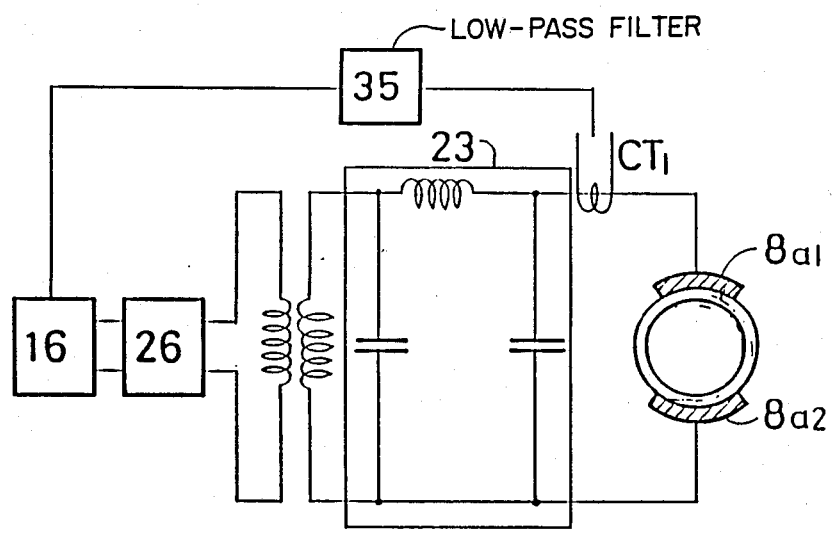
FIG. 5 is a circuit diagram of a third embodiment.

FIG. 5 is a circuit diagram of a third embodiment. Those parts in FIG. 5 which are identical to those of the FIGS. 1 and 4 are denoted by identical reference characters, and will not be described. Denoted at 16 is a DC power supply, and at 35 is a low-pass filter. In this embodiment, the power supplies have different drive frequencies, respectively. For example, if f1=2 MHz, and f2=2.1 MHz, then the current $I_1$ (CT1) becomes:

$$I_1 = Id + 2Is + AC\ (100\ KHz)$$

and hence is the sum of the DC component and the AC component. Where a low-pass filter having a cutoff frequency of 10 KHz is used, the AC component is removed leaving only the DC component, so that stable current control is made possible.

With current detectors located at CT2, CT3, the currents become:

$$I_2 = Id + Is/2 + AC(100\ KHz)$$

$$I_3 = Id + 2Is + Ir + AC(100\ KHz).$$

In this case, stable current control can be performed no matter where current detectors may be positioned.

[Fourth embodiment]

Figure 2:
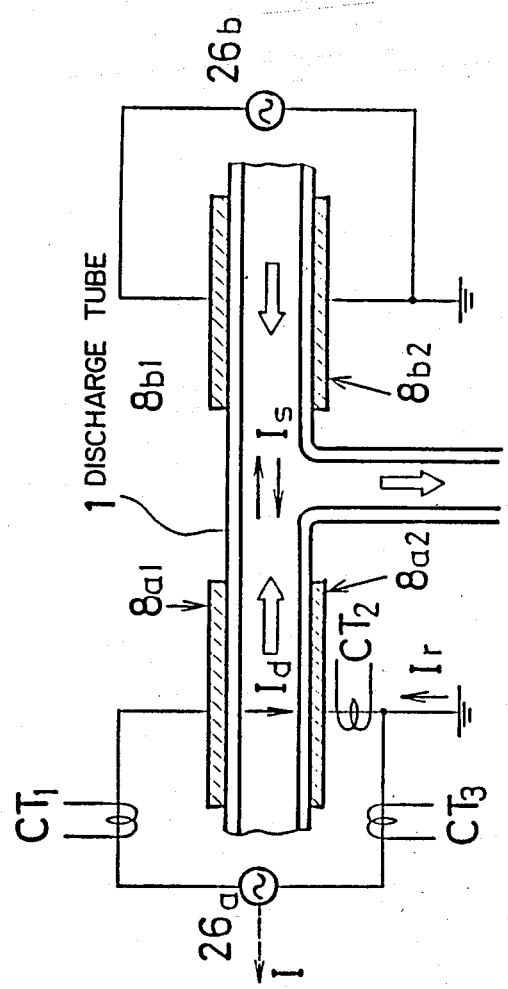
FIG. 2 is a view showing currents between electrodes.
Figure 3:
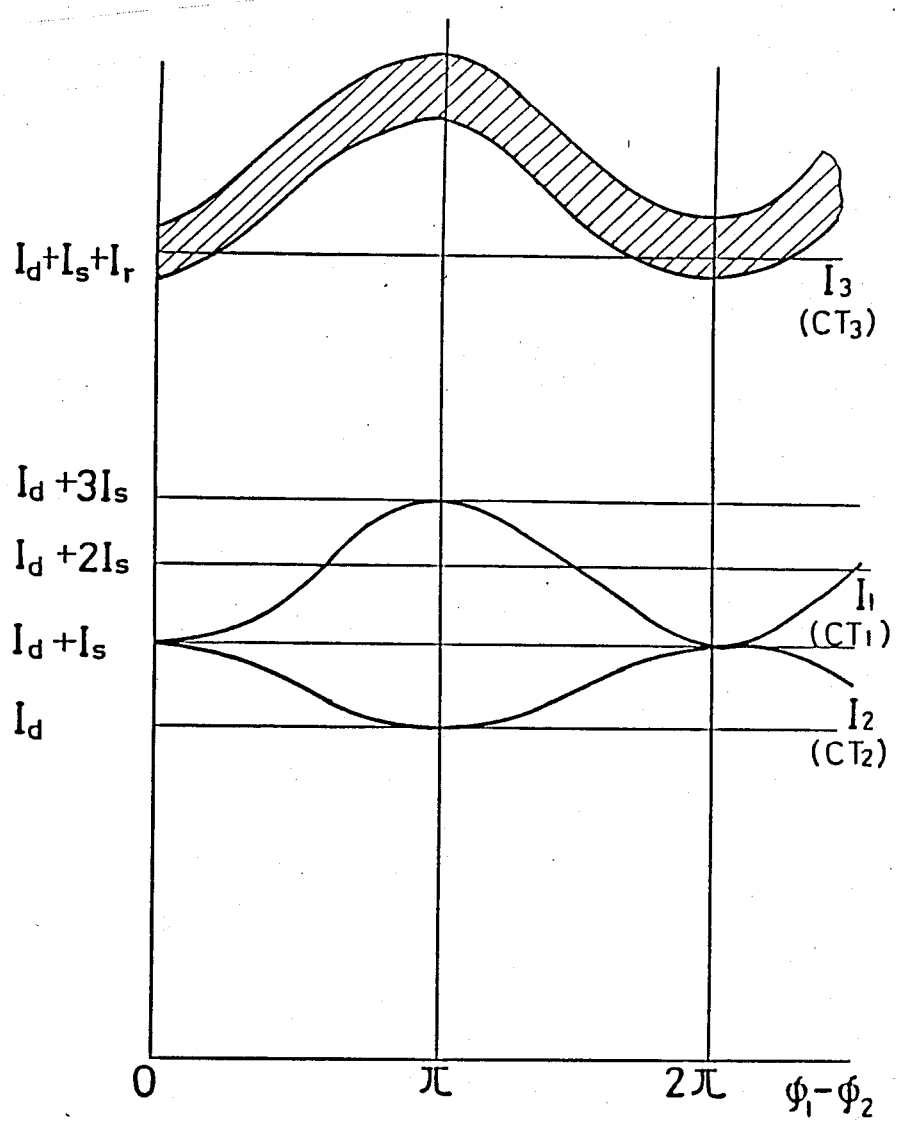
FIG. 3 is a graph showing currents of current detectors.
Figure 6:
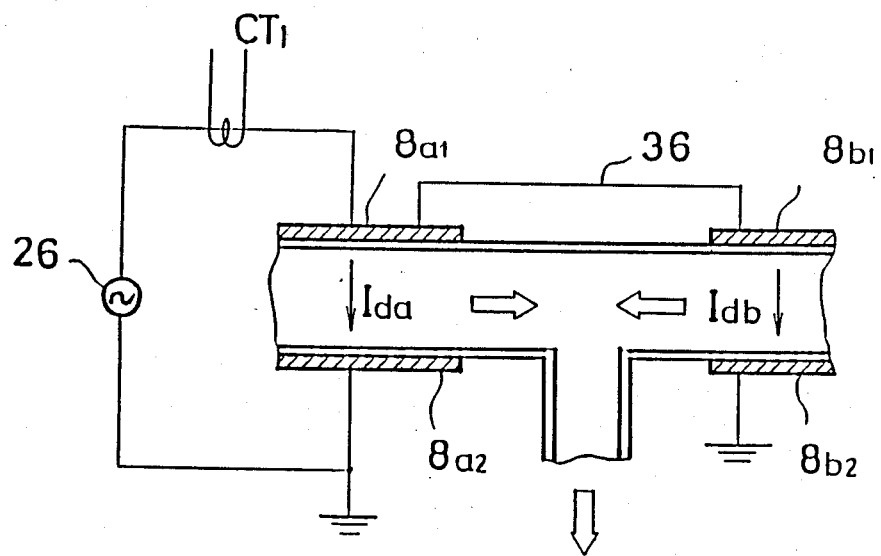
FIG. 6 is a circuit diagram of a fourth embodiment.

FIG. 6 is a circuit diagram of a fourth embodiment. Those parts in FIG. 6 which are identical to those of the FIG. 2 are denoted by identical reference characters, and will not be described. In this embodiment, a single high-frequency power supply 26 supplies electric power. The electrodes are interconnected by a lead 36. While the two electrodes are coupled, a suitable number of electrodes may be interconnected dependent on the capacity of the power supply and the output wattage thereof.

Figure 7:
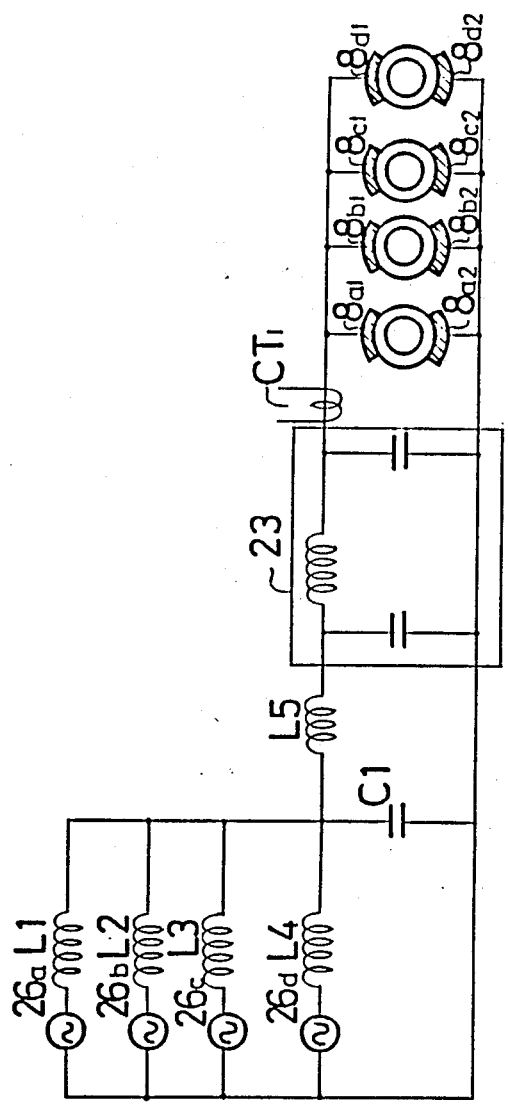
FIG. 7 is a circuit diagram of a first modification of the fourth embodiment.

FIG. 7 shows a circuit arrangement in which four high-frequency power supplies 26a~26d are connected in parallel. Those parts which are identical to those of FIGS. 4 and 6 are designated by identical reference characters, and third and fourth ones of the same parts are denoted by identical reference characters with suffixes c, d, respectively. To the power supplies, there are connected in series ballast inductances L1~L4 which are connected in parallel. A capacitor C1 and an inductance L5 are also connected as a smoothing circuit.

Figure 8:
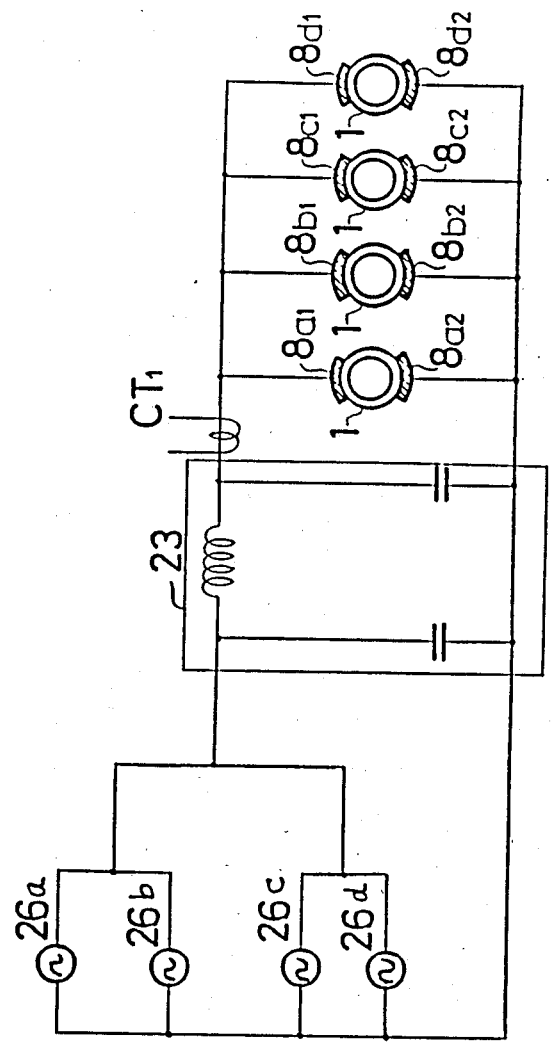
FIG. 8 is a circuit diagram of a second modification of the fourth embodiment.

FIG. 8 illustrates a circuit arrangement in which four identical high-frequency power supplies are connected in parallel. Although not shown, each of the power supplies has therein a loss circuit for producing a loss ranging from 10 to 30% so that even if any of the high-frequency power supplies is destroyed, the other high-frequency power supplies will not be affected.

[Fifth embodiment]

Figure 9:
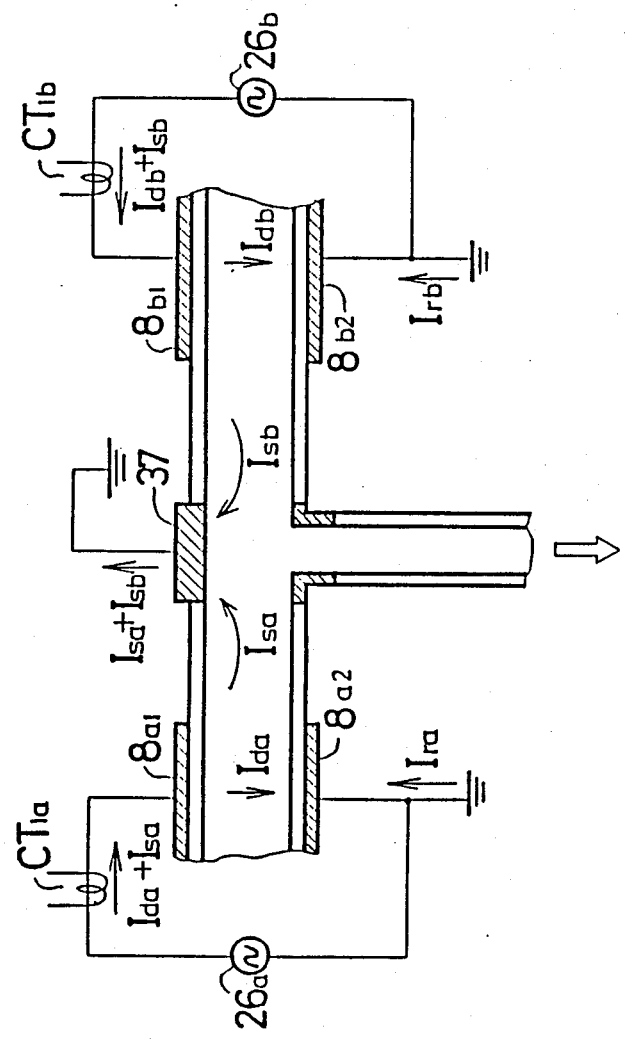
FIG. 9 is view of a fifth embodiment.
Figure 10:
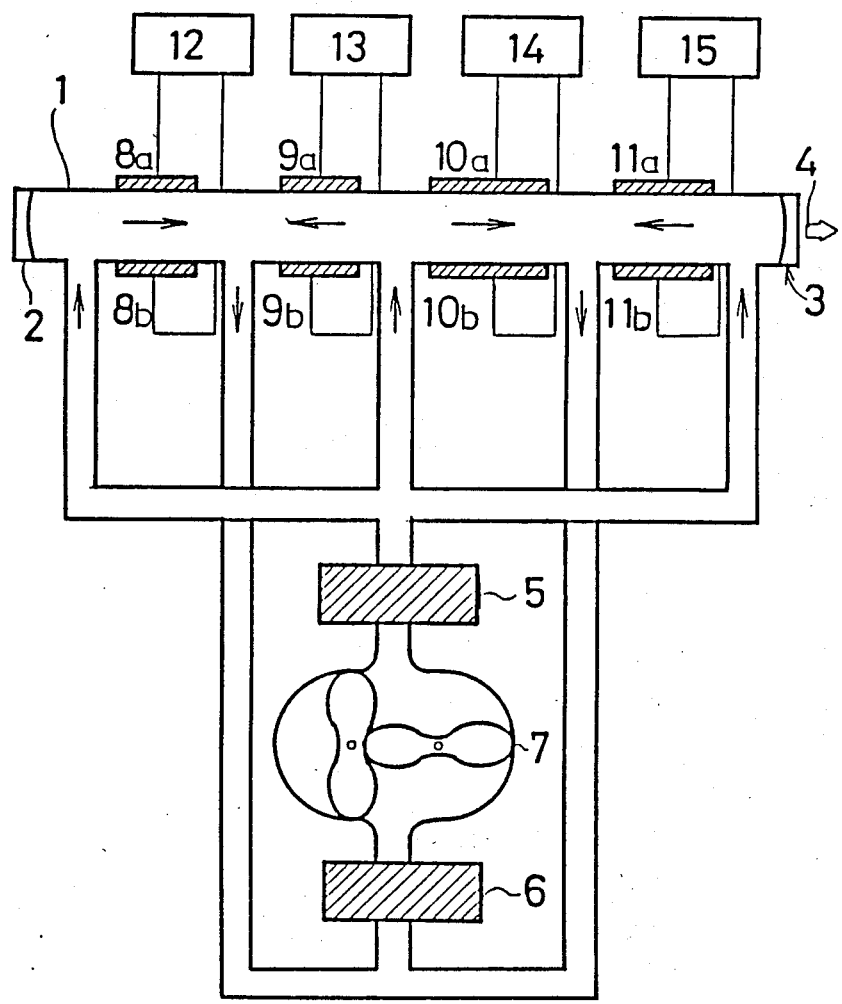
FIG. 10 is a view showing the principles of a conventional axial-flow RF discharge pumped laser oscillator device.
Figure 11:
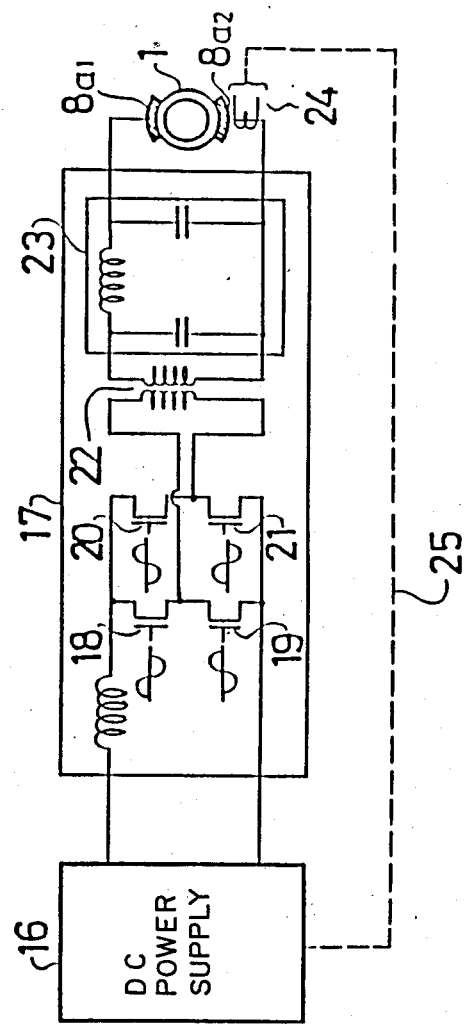
FIG. 11 is a view illustrating the principles of a conventional high-frequency power supply circuit for laser pumping.

FIG. 9 is a circuit diagram of a fifth embodiment. Those parts in FIG. 9 which are identical to those of the FIG. 2 are denoted by identical reference characters, and will not be described. Those currents flowing in the lefthand circuit are identified by a suffix a, and those in the righthand circuit are identified by a suffix b. In this embodiment, a third electrode 37 is disposed intermediate between the electrodes 8a, 8b and connected to ground. The electrode 37 allows mutual currents Isa, Isb to flow to ground, thus preventing plasma coupling due to the mutual currents. This arrangement is electrically simple. However, since the current Is is greater than would be if the electrode 37 did not prevent coupling; to prevent the current Is from being produced in the arc-discharge mode, it is necessary that the distances between the electrode 37 and the electrode 8a, 8b be about twice the distance between the electrodes on the discharge tube. This is to avoid being subjected to a C ballast due to one of the discharge tube walls when the currents flow into the electrode 37.

With the present invention, as described above, inasmuch as the device is not affected by mutual currents between the electrodes, various alarming conditions resulting from uncontrollable operation of the feedback loop and damage of semiconductor parts such as FETs are prevented from occurring, and stable current control can be performed.

We claim:

1. A laser oscillator device for applying a high-frequency voltage to a plurality of discharge regions of discharge tubes through a dielectric to produce a high-frequency discharge for laser pumping, comprising:
high-frequency power supply means for converting a DC power supply into high-frequency power supply outputs in response to a feedback signal; and
current detector means for detecting currents flowing through the discharge tubes, said current detector means being positioned to detect mutual currents between adjacent discharge tubes, and for providing the feedback signal in response to the detected currents.

2. A laser oscillator device according to claim 1, wherein said current detector means comprises a plurality of current detectors respectively disposed on high-voltage sides of the discharge tubes.

3. A laser oscillator device according to claim 1, wherein said current detector means comprises a plurality of current detector respectively disposed at grounded points of the discharge tubes and on low-voltage sides thereof.

4. A laser oscillator device for applying a high-frequency voltage to a plurality of discharge regions of discharge tubes through a dielectric to produce a high-frequency discharge for laser pumping, comprising:
high-frequency power supply means for converting a DC power supply into high-frequency power supply outputs in response to a feedback signal;
a common signal source connected to provide a drive signal to the high-frequency power supply means; and
current detector means for detecting currents flowing through the discharge tubes, and for providing the feedback signal response to the detecting currents.

5. A laser oscillator device for applying a high-frequency voltage to a plurality of discharge regions of discharge tubes through a dielectric to produce a high-frequency discharge for laser pumping, comprising:
high-frequency power supply means for converting a DC power supply into high-frequency power supply outputs in response to a feedback signal;
signal source means, each having a different frequency for driving corresponding ones of the high-frequency power means;
current detector means for detecting currents flowing through the discharge tubes and for providing signals including high-frequency components responsive to respective ones of the detected currents; and
low-pass filter means for removing high-frequency components from the signals from the current detector means, and for providing the feedback signal response to the filtered signals.

6. A laser oscillator device for applying a high-frequency voltage to a plurality of discharge regions of discharge tubes through a dielectric to produce a high-frequency discharge for laser pumping, comprising:
parallel-connected high-frequency power supply means for converting a DC power supply into high-frequency power supply outputs; and
current detector means for detecting currents flowing through the discharge tubes, said current detector means being positioned to detect mutual currents between adjacent discharge tubes, and for providing the feedback signal in response to the detected currents.

7. A laser oscillator device for applying a high-frequency voltage to a plurality of discharge regions of discharge tubes through a dielectric to produce a high-frequency discharge for laser pumping, comprising:
high-frequency power supply means for converting a DC power supply into high-frequency power supply outputs;

current detector means for detecting current flowing through the discharge tubs and for providing signals including high-frequency components responsive to respective ones of the detected currents; and
ground auxiliary electrode means, connected between intermediate portions of the discharge tubes and ground, for absorbing a mutual current flowing between the discharge tubes and for providing the feedback signal in response to the detected currents.

* * * * *